United States Patent
Estrada Cárdenas

(10) Patent No.: US 12,391,629 B2
(45) Date of Patent: Aug. 19, 2025

(54) SILICON-BASED AGRICULTURAL COMPOSITIONS

(71) Applicant: BIOLÓGICOS ESTRATÉGICOS BIOEST S.A.S., Siberia (CO)

(72) Inventor: Nicolás Estrada Cárdenas, Siberia (CO)

(73) Assignee: BIOLÓGICOS ESTRATÉGICOS BIOEST S.A.S., Siberia (CO)

( * ) Notice: Subject to any disclaimer, the term of this patent is extended or adjusted under 35 U.S.C. 154(b) by 965 days.

(21) Appl. No.: 17/598,286

(22) PCT Filed: Mar. 27, 2020

(86) PCT No.: PCT/IB2020/052895
§ 371 (c)(1),
(2) Date: Sep. 26, 2021

(87) PCT Pub. No.: WO2020/201948
PCT Pub. Date: Oct. 8, 2020

(65) Prior Publication Data
US 2022/0177386 A1 Jun. 9, 2022

(30) Foreign Application Priority Data
Mar. 29, 2019 (CO) ........................ NC2019/0003159

(51) Int. Cl.
*C05G 5/27* (2020.01)
*C05B 15/00* (2006.01)
(Continued)

(52) U.S. Cl.
CPC ................ *C05G 5/27* (2020.02); *C05B 15/00* (2013.01); *C05D 1/00* (2013.01); *C05D 9/02* (2013.01);
(Continued)

(58) Field of Classification Search
CPC .. C05B 15/00; C05D 1/00; C05D 9/02; C05D 1/005; C05D 1/04; C05D 1/02; C05D 9/00; C05F 1/02; C01B 33/325
See application file for complete search history.

(56) References Cited

U.S. PATENT DOCUMENTS 5,851,260 A * 12/1998 Aijala ...................... C05G 5/27
71/33
8,404,263 B2    3/2013 Ishaque et al.
(Continued)

FOREIGN PATENT DOCUMENTS

| CN | 104263022 A | 1/2015 |
| CN | 105712788 A | 6/2016 |

(Continued)

OTHER PUBLICATIONS

Primary Industries and Regional Development "Preparation of liquid fertilizer stock solutions" <https://www.agric.wa.gov.au/ nursery-cutflowers/preparation-liquid-fertiliser-stock-solutions> Jan. 5, 2015 (Year: 2015).*

(Continued)

*Primary Examiner* — Jennifer A Smith
(74) *Attorney, Agent, or Firm* — The Morales Law Firm; Joseph L. Morales, Esq.

(57) ABSTRACT

The present invention relates to a liquid fertilizer composition and a preparation method thereof, comprising potassium silicate, a pH regulator, an emulsifier and a solvent, useful in the prevention and control of plant diseases caused by different pathogens.

10 Claims, 6 Drawing Sheets

(51) Int. Cl.
  C05D 1/00   (2006.01)
  C05D 9/02   (2006.01)
  C05F 11/02  (2006.01)
  C05G 1/00   (2006.01)
  C05G 3/50   (2020.01)
(52) U.S. Cl.
  CPC ............ *C05F 11/02* (2013.01); *C05G 1/00* (2013.01); *C05G 3/50* (2020.02)

(56) References Cited

U.S. PATENT DOCUMENTS

| | | | |
|---|---|---|---|
| 2004/0050126 A1* | 3/2004 | Green | C05D 9/00 71/31 |
| 2009/0229331 A1 | 9/2009 | Wells | |
| 2009/0246297 A1 | 10/2009 | Norman et al. | |
| 2010/0016443 A1 | 1/2010 | Toledano et al. | |
| 2012/0276165 A1 | 11/2012 | Laane et al. | |
| 2013/0116119 A1 | 5/2013 | Rees et al. | |

FOREIGN PATENT DOCUMENTS

| | | | | |
|---|---|---|---|---|
| CN | 106083355 A | * | 11/2016 | |
| EP | 0496106 A1 | | 12/1995 | |
| ES | 2645193 T3 | | 4/2017 | |
| GB | 1570368 A | * | 7/1980 | ............ C05B 7/00 |
| JP | 198756389 A | | 9/1987 | |
| JP | 1988242986 A | | 10/1988 | |
| JP | 1991141206 A | | 11/1992 | |
| JP | 199378189 A | | 10/1994 | |
| JP | 2263784 A | | 8/1996 | |
| JP | 1995101792 A | | 11/1996 | |
| JP | 2011530467 A | | 12/2011 | |
| JP | 2014212703 A | | 11/2014 | |
| JP | 2022518098 A | | 3/2022 | |
| MX | 2017012740 A | | 1/2018 | |
| WO | 2014126584 A1 | | 8/2014 | |
| WO | 2014185794 A1 | | 11/2014 | |
| WO | 2018034864 A1 | | 2/2018 | |
| WO | 2020201948 A1 | | 10/2020 | |

OTHER PUBLICATIONS

Timothy R. Cook et al., "Solar Energy Supply and Storage for the Legacy and Nonlegacy Worlds", Chem. Rev. 2010, 110, 6474-6502.
Ulrike G., "Can we improve global food security? A socio-economic and political perspective", Food Sec. 2014, 6, 187-200.
Chakraborty & Newton, "Climate change, plant diseases and food security: an overview", Plant Pathology. 2011, 60, 2-14.
Fabrício R., "Silicon and Plant Diseases", Springer. 2015.
Guntzer F, "Benefits of plant silicon for crops: a review", Agron Sustain Dev. 2012 32,201-213.
Ch. Baehr et al., "Soluble Silicates-Highly Versatile and Safe", International Journal for Applied Science, 2007, 133, 88-94.
Yanping X, et al., "Antibacterial Activity and Mechanism of Action of Zinc Oxide Nanoparticles against Campylobacter jejuni", Journal of American Society for Microbiology, 2011; 77(7): 2325-2331.
Rajveer S, et al., "Synthesis, characterization and enhanced antimicrobial activity of reduced graphene oxide-zinc oxide nancomposite", Mater. Res. Express, 2017,1-8.
Lili HE et al., "Antifungal activity of zinc oxide nanoparticles against Botrytis cinerea and Penicillium expansum", Microbiological Research. 2011, 166, 207-215.
Becheri A., et al., "Synthesis and characterization of zinc oxide nanoparticles: application to textiles as UV- absorbers", J. Nanopart. Res, 10: 679-689.
Azam A., et al., "Low temperature synthesis of ZnO nanoparticles using mechanochemical route: a green chemistry approach", IJTAS, 2009, 1(2): 12-14.
Sardella, D., Gatt, R., & Valdramidis, V. P. "Physiological effects and mode of action of ZnO nanoparticles against postharvest fungal contaminants", (2017).. Food research international (Ottawa, Ont.), 101, 274-279. https://doi.org/10.1016/j.foodres.2017.08.019.
Menzies, J., Bowen, P., Ehret, D., & Glass, A. D. M. Foliar applications of potassium silicate reduce severity of powdery mildew on cucumber, muskmelon, and zucchini squash. Journal of the American Society for Horticultural Science, (1992). 117(6), 902-905. https://doi.org/10.21273/jashs.117.6.902.

* cited by examiner

SILICON-BASED AGRICULTURAL COMPOSITIONS

FIELD OF THE INVENTION

The present invention relates to the field of agricultural chemistry, and in particular, to liquid fertilizer compositions and a method of preparation thereof designed for the fertilization and protection of plants against several types of pests, due to the strengthening of the cell wall of several plant tissues.

BACKGROUND OF THE INVENTION

Over time, the implementation of silicon-based fertilizer compositions has been used in a wide variety of plants due to its several benefits, where the use of silicon in agriculture probably started more than 2000 years ago ("*A proposed history of silicon fertilization*" Matichenkov et al., Studies in plant science, 2001, 8, 36). Several studies show that silicon is involved in plant physiology due to high tolerance to heavy metal toxicity, mechanical protection against pathogens and also plant nutrition since it has been considered as an essential plant nutrient ("*Silicon and Plan Diseases*", Fabrício R. et al., Springer. 2015). In particular, it has been shown that the use of silicon in agriculture is quite important, because the plant epidermis is siliceous, which gives an improvement in the plant cellular structure, providing support and protection to the plant from biotic stresses, since the presence of silicon in the organic tissue provides an increase in resistance to different conditions such as strong winds, rains, as well as an increase in resistance to insects (Elements of agricultural chemistry: in a course of lectures for the Board of Agriculture, David H, 1819). One of the most notable effects of silicon is the prevention of multiple plant diseases caused by pathogenic organisms through different strategies, wherein by supplementing plant nutrition with silicon there is evidence of a decrease in the effect of several diseases. Additionally, fertilizing plants with silicon has been shown to be a simple and sustainable way to help maintain and improve plant health in agriculture ("*Mineral nutrition and plant disease*" Datnoff et al., The American Phytopathological Society, 2007, 233-246).

Now, one of the well-known ways of incorporating silicon in the treatment of crops is by spraying silicate solutions on plants, because they form a physical barrier on the surface of the plant that prevents pathogens from infecting it. Recently it has been shown that silicates allow the activation of certain defense pathways in plants against pathogens ("*Silicon and Plant Diseases*", Fabrício R. et al., Springer, 2015).

In spite of the multiple advantages mentioned above, about silicates as agrochemical substances, normally the mixtures containing silicates are unstable because they precipitate at pH values lower than 9. For this reason, the compositions that include silicates, as active ingredient, are commercialized in the form of Na or K silicates that show pH values higher than 9. However, sodium silicates have shown an increase in salinity, increase in electrical conductivity and decrease in the compatibility with other elements of vital importance in plant nutrition.

On the other hand, patent CN101440001 discloses a liquid fertilizer composition based on water-soluble silicates in concentrations of 15 to 44% w/v, such as sodium silicate and potassium silicate, further comprising urea, salts of trace elements, such as Fe, Cu, Mg, Zn, Mn, Mo, chelating agents (EDTA) and fulvic acid in concentrations between 10 and 15% w/v. The liquid fertilizer composition has a pH between 5.0 and 6.0.

Now, patent US20100016162 discloses an aqueous foliar composition for reducing fungal or bacterial diseases in crops. The composition comprises a silicon source, such as potassium silicate at a concentration between 2% and 25% w/v, a thiosulfate source at a concentration between 1% and 40% w/v, such as potassium, ammonium or sodium thiosulfate to inhibit the polymerization of silicic acid or silicate ions and a mixture of organic acids, such as fulvic acids and humic acids with alcohols, polyamines or polysaccharides in a concentration between 2% and 30% w/v with functional groups capable of reversibly binding or forming complexes with inorganic anions or cations. In addition, the patent discloses a composition having a pH of at least 7.0. Additionally, patent U.S. Pat. No. 5,183,477 discloses a foliar spray composition for use on agricultural and horticultural plants comprising an alkali metal silicate selected from $K_2SiO_3$ (potassium silicate), $Na_2SiO_3$, $Na_4SiO_4$, $Na_2Si_2O_4$, $Na_2Si_4O_4$, $KHSi_2O_5$, $K_2Si_4O_3 \cdot H_2O$ and mixtures thereof. The patent discloses a composition comprising potassium silicate, EDTA salts, citric acid and water.

However, potassium silicate is used in agriculture as a fertilizer and as a protective product for several pests, such as fungi and insects. The problem with the use of potassium silicate is in the application in the field, since due to its alkaline nature it polymerizes easily. In addition, the application shows an increase in costs for labor and the reagent itself. In the first place, the cost of labor increases because more personnel are needed to apply the product either alone or in an alkaline mixture, and the application time increases because the doses would be more frequent. On the other hand, the cost of the reagent is higher because when the application is made using only potassium silicate, a higher concentration of it is needed.

The present invention describes the preparation of a liquid fertilizer composition comprising potassium silicate, a pH regulator, an emulsifier and a solvent, wherein the composition is characterized by having a pH between 4.5 to 6 and a particle size of from 5 to 40 μm.

The silicate fertilizer composition of the present invention is characterized by generating a solid protective layer thanks to foliar application, which allows pathogens not to function properly. Moreover, it allows a high and perfect compatibility with common agricultural elements and becomes a constituent element of the plant, because the composition enters the plant via stomata or cell wall.

BRIEF DESCRIPTION OF THE INVENTION

Figure 1:
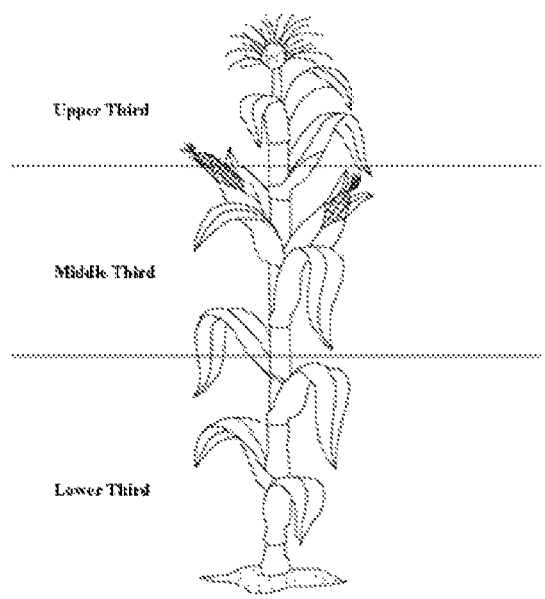
FIG. 1 Methodology for assessing pest incidence (*Spodoptera frugiperda*), where 1) is the lower third, 2) is the middle third and 3) is the upper third.

The present invention corresponds to a liquid fertilizer composition and a preparation method thereof, comprising potassium silicate, a pH regulator, an emulsifier and a solvent, wherein the composition is characterized by having a pH between 4.5 to 6 and a particle size of 5 to 40 µm. In particular, the composition is characterized because it allows a high and perfect compatibility with elements of agricultural use and is useful in the prevention and control of plant diseases caused by different pathogens. Therefore, the composition has application in the agricultural industry as a fertilizer and fungicide with low environmental impact.

DETAILED DESCRIPTION OF THE INVENTION

The present invention corresponds to a liquid fertilizer composition and a preparation method thereof, wherein the composition functions as an essential nutrient in plants, producing a better growth and reproduction of the same, provides a great compatibility with different nutrients, allows the systematic entry into the plant via stomata or cell wall, and is used as a pesticide, since the composition creates a protective layer when performing the foliar application, which prevents the proper functioning of fungi or pests.

Broadly speaking, the silicate-based composition comprises potassium silicate, a pH regulator, an emulsifier and a solvent.

It is understood as potassium silicate, for the purposes of the present invention, inorganic compounds, in which the most common potassium silicate has the formula $K_2SiO_3$, these are white solids or colorless solutions. Potassium silicate is a corrector and benefactor of the physical, chemical and microbiological structure of soil and plants. The silicate-based composition of the present invention comprises between 50 to 90% weight by weight of potassium silicate. The silicate-based composition of the present invention comprises between 60 to 80% weight by weight of potassium silicate.

The pH adjusters are a solution that has the ability to resist pH changes when small amounts of strong acid or base are added, thus controlling the pH value of a solution. Among the pH regulators are citric acid, lactic acid, formic acid, glycolic acid, malic acid, 1-naphthoic acid, 3-nitrobenzoic acid, 4-nitrobenzoic acid, nitrous acid, oxoacetic acid, sulfanilic acid, mercaptoacetic acid, humic acids, fulvic acids, amino acids or mixtures thereof. The silicate-based composition of the present invention comprises between 2 to 20% weight by weight of the pH regulator. The silicate-based composition of the present invention comprises between 5 to 17% weight by weight of the pH regulator. The silicate-based composition of the present invention comprises between 8 to 14% weight by weight of the pH regulator.

Emulsifier is a compound or substance that allows or promotes the formation of a mixture of two substances that usually are poorly miscible or difficult to mix. Emulsifiers include, but are not limited to, methylcellulose, carboxymethylcellulose, sulfonic acid derivatives, sorbitan esters (Span), polysorbates (tween), perlapon EAM® (blend of vegetable oil derived surfactants, anionic and non-ionic surfactants), soybean oil or mixtures thereof. The silicate-based composition of the present invention comprises between 1 to 20% weight by weight of the emulsifier. The silicate-based composition of the present invention comprises between 5 to 15% weight by weight of the emulsifier.

A solvent is a substance capable of dissolving another substance commonly known as a solute, resulting in a uniform mixture known as a solution. Solvents include water, butylene glycol, dipropylene glycol, ethylene glycol, propylene glycol, triethylene glycol, glycerin or mixture thereof. The silicate-based composition of the present invention comprises between 1 to 50% weight by weight of solvent. The silicate-based composition of the present invention comprises between 10 to 40% weight by weight of solvent. The silicate-based composition of the present invention comprises between 20 to 30% weight by weight of solvent.

The silicate-based compositions of the invention are characterized by having a pH between 4.5 to 6. The silicate-based compositions of the invention are characterized by having a pH between 5 to 5.5.

The silicate-based compositions of the invention are characterized in having a particle size between 5 to 40 µm. The silicate-based composition of the present invention is characterized in having a particle size between 15 to 30 µm.

The silicate-based compositions of the invention also comprise a dispersant, wherein its function is to increase particle separation and prevent agglutination. Among the dispersants are polymethylmethacrylate-polyethylene glycol graft copolymer in copolymeric acrylic solution (atlox 4913™), xanthan gum, amine salt composition of polyaryl phenol ether phosphate (Kapolgen FL® or Perlapon FL®), sodium salt of polyalkyl naphthalene sulfonic acid condensed formaldehyde (Perlapon NSSR), or mixtures thereof. The silicate-based composition of the present invention comprises between 0.05 to 25% weight by weight of dispersant. The silicate-based composition of the present invention comprises between 5 to 20% weight by weight of dispersant. The silicate-based composition of the present invention comprises between 10 to 15% weight by weight of dispersant.

The silicate-based compositions of the invention also comprise an antifreeze, wherein its function is to reduce the solidification point of the liquids, achieving that the final mixture does not freeze at a lower temperature. Among the antifreeze agents are propylene glycol, butylene glycol, dipropylene glycol, ethylene glycol, propylene glycol, triethylene glycol methanol, ethylene glycol, or mixtures thereof. The silicate-based composition of the present invention comprises between 1 to 15% weight by weight of antifreeze. The silicate-based composition of the present invention comprises between 5 to 10% weight by weight of antifreeze.

The liquid fertilizer compositions of the invention also comprise amino acids including alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine or mixtures thereof. The liquid fertilizer composition of the present invention comprises between 1 to 15% by weight by weight of amino acids. The composition of the present invention comprises between 5 to 10% weight by weight of amino acids.

Additionally, the liquid fertilizer compositions of the invention also comprise chelating agents, wherein a chelating agent is an organic substance capable of inactivating a metal ion, with the formation of a cyclic or ring structure, in which the metal occupies the center of the structure, whereby the metal ion is removed from its normal chemical action by being "chelated" or sequestered. Chelating agents include citric acid, tartaric acid, gluconic acid, ethylenediaminetetraacetic acid (EDTA), hydroxyethylenediamine triacetic acid (HEDTA), nitrilotriacetic acid (NTA), malic acid, fumaric acid and mugineic acid, or mixtures thereof. The liquid fertilizer composition of the present invention comprises between 1 to 25% weight by weight of chelating agents. The liquid fertilizer composition of the present invention comprises between 5 to 10% weight by weight of chelating agents.

The liquid fertilizer compositions of the invention also comprise nutrients, wherein nutrients are those chemical elements that plants need in order to grow, maintain themselves and produce fruits and seeds, plants take nutrients from the air, soil and water. Nutrients are divided into two types: macronutrients that are needed in large amounts, among which nitrogen, phosphorus and potassium, and micronutrients that are needed in small amounts, among which can be found calcium, magnesium, manganese, sulfur, zinc, iron, copper, boron, cobalt and molybdenum, can be found. In addition, chemical sources of nutrients include potassium phosphite, phosphorous acid, boric acid, hydrated lime, potassium carbonate, urea, zinc sulphate, copper sulphate, zinc oxide, copper oxide, zinc nitrate, triple superphosphate, ground rock phosphate, calcium aluminum phosphate, ammonium sulphate, ammonium nitrate, potassium sulphate, potassium chloride, manure, poultry manure, bi-calcium phosphate, mono potassium phosphate, dipotassium phosphate, potassium nitrate, calcium nitrate, or mixture thereof. The liquid fertilizer composition of the present invention comprises between 1 to 50% weight by weight of chemical sources of nutrients. The liquid fertilizer composition of the present invention comprises between 10 to 40% weight by weight of chemical sources of nutrients. The liquid fertilizer composition of the present invention comprises between 20 to 30% weight by weight of chemical sources of nutrients.

The liquid fertilizer compositions of the invention also comprise fulvic acids which are a natural substance that is produced in the soil by the decomposition of organic matter, which is absorbed by plants, these are considered a fraction of the humus soluble in base, which remains in solution after acidification. The liquid fertilizer composition of the present invention comprises between 1 to 15% weight by weight of fulvic acids. The liquid fertilizer composition of the present invention comprises between 5 to 10% weight by weight of fulvic acids.

The liquid fertilizer compositions of the present invention comprising preservatives which are substances that stop or minimize spoilage caused by the presence of different types of microorganisms. Among the preservatives are potassium sorbate, calcium sorbate, sodium sorbate, sodium benzoate, potassium benzoate, calcium benzoate, potassium bisulfite, calcium bisulfite, or mixture thereof. The liquid fertilizer composition of the present invention comprises between 0.01 to 5% weight by weight of preservatives. The liquid fertilizer composition of the present invention comprises between 1 to 4% weight by weight of preservatives. The liquid fertilizer composition of the present invention comprises between 2 to 3% weight by weight of preservatives.

The compositions of the present invention comprise potassium silicate, citric acid, lactic acid, perlapon EAM®, soybean oil, atlox 4913™, xanthan gum, propylene glycol and water, wherein said composition is a silicate-based composition.

In another embodiment the liquid fertilizer compositions of the present invention comprise the silicate-based composition, and in addition additional ingredients comprising amino acids, chelating agents, nutrients, fulvic acids and moisturizing agents, or mixture thereof, wherein the silicate-based composition comprises between 10 to 98% weight by weight of the composition. In another embodiment the silicate-based composition comprises between 20 to 88% weight by weight of the liquid fertilizer composition. In another embodiment the silicate-based composition comprises between 30 to 78% weight by weight of the liquid fertilizer composition. In another embodiment the silicate-based composition comprises between 40 to 68% weight by weight of the liquid fertilizer composition.

In another embodiment the liquid fertilizer compositions of the present invention comprise the silicate-based composition, and in addition potassium phosphite, copper sulfate, zinc sulfate, EDTA, xanthan gum and potassium sorbate, wherein the silicate-based composition comprises between 10 to 98% weight by weight of the composition. In another embodiment the silicate-based composition comprises between 20 to 88% weight by weight of the liquid fertilizer composition. In another embodiment the silicate-based composition comprises between 30 to 78% weight by weight of the liquid fertilizer composition. In another embodiment the silicate-based composition comprises between 40 to 68% weight by weight of the liquid fertilizer composition.

In another embodiment the liquid fertilizer compositions of the present invention comprise the silicate-based composition, and in addition hydrated lime, phosphorous acid, potassium carbonate, zinc sulfate, EDTA, boric acid, urea, xanthan gum, potassium sorbate and water, wherein the silicate-based composition comprises between 10 to 98% weight by weight of the liquid fertilizer composition. In another embodiment the silicate-based composition comprises between 20 to 88% weight by weight of the liquid fertilizer composition. In another embodiment the silicate-based composition comprises between 30 to 78% weight by weight of the liquid fertilizer composition. In another embodiment the silicate-based composition comprises between 40 to 68% weight by weight of the liquid fertilizer composition.

In another embodiment, the liquid fertilizer compositions of the present invention comprise the silicate-based composition, and in addition fulvic acid, xanthan gum, potassium sorbate and water, wherein the silicate-based composition comprises between 10 to 98% weight by weight of the liquid fertilizer composition. In another embodiment the silicate-based composition comprises between 20 to 88% weight by weight of the liquid fertilizer composition. In another embodiment the silicate-based composition comprises between 30 to 78% weight by weight of the liquid fertilizer composition. In another embodiment the silicate-based composition comprises between 40 to 68% weight by weight of the liquid fertilizer composition.

In another embodiment the liquid fertilizer compositions of the present invention comprise the silicate-based composition, and in addition amino acids, xanthan gum, potassium sorbate and water, wherein the silicate-based composition comprises between 10 to 98% weight by weight of the liquid fertilizer composition. In another embodiment the silicate-based composition comprises between 20 to 88% weight by weight of the liquid fertilizer composition. In another embodiment the silicate-based composition comprises between 30 to 78% weight by weight of the liquid fertilizer composition. In another embodiment the silicate-based composition comprises between 40 to 68% weight by weight of the liquid fertilizer composition.

In another embodiment the particle size of the suspension in the silicate-based compositions of the invention is between 2 to 15 µm.

The present invention also includes the method for preparing the liquid compositions of the present invention. The method includes:
a) Stirring the solvent in a mixing tank;
b) mixing the emulsifier and dispersants in a mixing tank;
c) adding the mixture of b) with the solvent of a) and stir;
d) adding to the mixture (c) pH regulators and antifreeze;
e) adding potassium silicate;
f) adding the dispersing agent to the mixture obtained in e)
g) recirculating;
h) milling;
i) second grinding;
j) mixing the mixture obtained from (i) with a dispersant.

For the purposes of the present invention, the mixing tank consists of an open vessel, and a mechanical agitator or impeller, mounted on a shaft and driven by an electric motor. In addition, an agitator is mounted on a shaft suspended from the top, allowing a speed of 750 to 950 rpm. The shaft is driven by a motor, connected to the same, but more frequently, through a reduction gearbox.

Stage b) in the method of the invention comprises mixing in an additional vessel the emulsifiers and the dispersants, the mixture is stirred between 5 to 30 minutes at a speed of 750 to 950 rpm until the solution is emulsified.

Stage c) in the method of the invention comprises in turning on the mixing tank of stage a) and adding the mixture of stage b) and starting the stirring process at a speed of 750 to 950 rpm.

Mixing tank agitators comprise paddle or blade agitators. These agitators consist of a flat blade attached to a rotating shaft, where the liquid flow has a large radial component in the plane of the blade and also a large rotational component. Paddle or blade agitators are useful for simple mixing operations, e.g., mixing of miscible liquids or dissolving of solid products.

Stage d) in the method of the invention comprises adding the pH regulators and the antifreeze and mixing them for 15 to 20 minutes until a homogeneous solution is obtained.

Stage e) in the method of the invention comprises slowly adding the potassium silicate and stirring at a speed of 750 to 950 rpm for 15 minutes to 25 minutes.

Stage f) in the method of the invention comprises adding the dispersant and stirring the mixture for between 30 and 60 minutes at a speed of 750 to 950 rpm.

The method of the present invention further includes measuring the density and pH of the composition.

After carrying out the chemical process, the mixture obtained in step f) is passed to the milling equipment by means of a recirculation process with the help of an emulsifier.

The stage h) in the method of the invention comprises in performing a first grinding with a colloid mill aiming at a particle decrease of about 40 to 80 µm.

A colloid mill is used for micro-grinding, mixing, emulsifying, homogenizing and dispersing by means of a high-speed rotating rotor and a stator with straight or cross teeth. When the mill is driven, high frequency vibrations are generated inside the grinding chamber, so that the introduction of the mixture starts an action reinforced by the cavitation effects caused by the fall of the hydrodynamic potential that accompanies the vibrations.

Stage i) in the method of the invention comprises performing a second grinding with a colloid mill or zirconium bead mill until a particle size of about 5 to 30 µm is obtained.

The grinding stages may be carried out in a ball mill comprising a fixed cylindrical vessel, such as those known to the person moderately skilled in the art. The axis of the cylinder may be either horizontal or at a small angle to the horizontal. It is partially filled with balls. The abrasive media are made of ceramic or zirconium (beads between 0.6 mm to 2 mm). The inside surface of the cylinder is normally studded with an abrasion resistant material such as manganese steel. The ball mill rotates around a horizontal shaft, partially filled with the material to be ground plus the abrasive medium, an internal cascade-effect reduces the material to a fine powder.

In addition, ball mills are used to obtain very fine granulometries in classic grinding and mixing processes. On the other hand, the centrifugal force in ball mills is extremely high, which results in very short grinding times. Ball mills have the advantage of powerful and fast grinding down to the submicron range, energy and speed are adjustable and replicable results are guaranteed. In addition, ball mills are suitable for long-term tests where dry and wet grinding can be carried out.

Ball mills are used in the present invention to obtain an ore particle size between 0 to 30 µm and 0 to 200 µm.

The critical speed is the minimum speed of rotation reached by the mill, so that the centrifugal force created is sufficient to get the balls stuck to the mill liners, where ball mills usually work with speeds between 72 to 77% of the critical speed depending on the mill diameter.

The charge volume indicates the volume occupied by the ball charge inside the mill, considering also the empty spaces between the balls and is expressed as a percentage of the total volume inside the mill. The charge volume when the mill is at rest (empty) is lower than when the mill is rotating (under load) with the same charge of balls, where ball mills work with a degree of filling between 40 and 45% (overflow discharge) and in some cases may reach up to 50% (grate discharge).

The type of material to be milled includes soft, hard, brittle, dry-fibrous or wet material.

Stage j) in the method of the invention comprises stirring 0.5 to 3 grams/L of dispersant and stirring for 30 to 60 minutes.

EXAMPLES

Example 1

Preparation of the Liquid Fertilizer Composition:

For the preparation of a liquid silicate-based fertilizer composition, the solvent is added to the reaction tank. Immediately, stirring is started at a speed of 750 to 950 rpm in the tank and the previously mixed emulsifiers and dispersants are added. The previously formed mixture is stirred for 10 min until the solution is emulsified. The pH regulators and antifreeze are added to the emulsion and stirred constantly for 15 to 30 minutes, until the pH regulators are completely dissolved in the mixture and a homogeneous solution is obtained. Also, small portions of potassium silicate are added, maintaining constant agitation for 5 to 30 minutes. Subsequently, the mixture formed is transferred to a milling equipment by means of a recirculation process, an emulsifier may be optionally used, where the milling process is started by means of a colloidal mill obtaining a particle size of approximately 40 to 80 µm. Immediately, the particle is passed to a zirconium bead mill until the particle size is reduced to 10 μm. The dispersants are mixed with the formed particle and stirred for 30 minutes. The final volume of the suspension is checked and adjusted with water if necessary. Finally, a 100 cm³ sample is taken and the density and pH of the suspension is measured.

Example 2

Preparation of the Liquid Fertilizer Composition Based on Silicate (SILICON F):

For the preparation of a liquid fertilizer composition based on silicate, 120 cm³ of water is added to the reaction tank. Immediately start stirring in the tank and add 60 cm³ of soy bean oil, 20 g of EAM Perlapon® and 15 g of atlox 4913™. The previously formed mixture is stirred for 10 min until the oil is emulsified. To the emulsion, 80 g of lactic acid, 90 g of propylene glycol and 135 g of citric acid are added and stirred constantly for 10 to 40 minutes until the citric acid is completely dissolved in the mixture and a homogeneous solution is obtained. Also, small portions of potassium silicate (900 g) are added, keeping the agitation constant for 10 to 40 minutes. Subsequently, the mixture formed is transferred to a milling equipment through a recirculation process with the help of an emulsifier, where the milling process is started by means of a colloidal mill obtaining a particle of approximately 30 to 100 μm. Immediately, the particle is passed to a zirconium bead mill until the particle size is decreased to 10 μm. Then, 1 g of previously hydrated xanthan gum is mixed with the formed particle and stirred for 30 minutes. The final volume of the suspension is checked and adjusted with water if necessary. Finally, a sample of 100 cm³ is taken and the density and pH of the suspension are measured.

| Preparation of the liquid silicate-based fertilizer composition | | | | | |
|---|---|---|---|---|---|
| | Example 2 | Example 3 | Example 4 | Example 5 | Example 6 |
| Potassium silicate | 63.55% w/w | 57.94% w/v | 59.16% w/v | 65.27% w/v | 50.49% w/v |
| pH Regulator | 15.18% w/w | 13.84% w/w | 14.13% w/w | 15.59% w/w | 12.06% w/w |
| citric acid | 9.53% w/w | 8.69% w/w | 8.87% w/w | 9.79% w/w | 7.57% w/w |
| lactic acid | 5.65% w/w | 5.15% w/w | 5.26% w/w | 5.80% w/w | 4.49% w/w |
| Emulsifier | 5.31% w/w | 4.84% w/w | 4.94% w/w | 5.45% w/w | 4.22% w/w |
| soybean oil | 3.90% w/w | 3.55% w/w | 3.63% w/w | 4.00% w/w | 3.10% w/w |
| perlapon EAM ® | 1.41% w/w | 1.29% w/w | 1.31% w/w | 1.45% w/w | 1.12% w/w |
| Solvent (water) | 8.47% w/w | 16.55% w/w | 14.79% w/w | 5.99% w/w | 27.29% w/w |
| Dispersant | 1.13% w/w | 1.03% w/w | 1.05% w/w | 1.16% w/w | 0.90% w/w |
| atlox 4913 ™ | 1.06% w/w | 0.97% w/w | 0.99% w/w | 1.09% w/w | 0.84% w/w |
| xanthan gum | 0.07% w/w | 0.06% w/w | 0.07% w/w | 0.07% w/w | 0.06% w/w |
| Antifreeze (propylene glycol) | 6.36% w/w | 5.79% w/w | 5.92% w/w | 6.53% w/w | 5.05% w/w |

This silicate base is used in the examples described below.

Example 7

Preparation of the Liquid Fertilizer Composition Based on Silicate and Cu/Zn (SIKONFERT® Copper Zinc):

For the preparation of a liquid fertilizer composition based on silicate and Cu/Zn, 150 L of potassium phosphite is added to the mixing tank. Stirring is started and 25.2 kg of copper sulphate, 27 kg of zinc sulphate and 15 kg of EDTA are added and stirred for 30 minutes. Subsequently, 135 L of the silicate base prepared in example 1 to 6 is added and the agitation of the mixture is continued for 30 minutes. Then, 0.75 kg of xanthan gum (previously hydrated with 0.15 kg of potassium sorbate) is added to the mixture and stirred for 1 hour.

| Preparation of the liquid fertilizer composition based on silicate and Cu/Zn | | | | |
|---|---|---|---|---|
| | Example 7 | Example 8 | Example 9 | Example 10 |
| Silicate base | 38.23% w/w | 34.13% w/w | 21.80% w/w | 43.44% w/w |
| Additional Ingredients | 61.77% w/w | 65.87% w/w | 78.20% w/w | 56.56% w/w |
| Potassium phosphite | 42.48% w/w | 46.93% w/w | 61.03% w/w | 39.10% w/w |
| Copper sulphate | 7.14% w/w | 7.17% w/w | 7.32% w/w | 7.30% w/w |
| Zinc sulphate | 7.65% w/w | 7.25% w/w | 5.23% w/w | 5.56% w/w |
| EDTA | 4.25% w/w | 4.27% w/w | 4.36% w/w | 4.34% w/w |
| Xanthan gum | 0.21% w/w | 0.21% w/w | 0.22% w/w | 0.22% w/w |
| Potassium sorbate | 0.04% w/w | 0.04% w/w | 0.04% w/w | 0.04% w/w |

Example 11

Preparation of Liquid Fertilizer Composition Based on Silicate and Phosphite (SIKONFERT® Phosphite):

For the preparation of a liquid fertilizer composition based on silicate and phosphite, 195 L of water is added to the mixing tank, starting the agitation and adding 27 kg of hydrated lime. Subsequently, 72.6 kg of phosphorous acid and 9 kg of potassium carbonate are slowly added, the solution is stirred and the particles are left to settle for 24 hours, after which time a filtration process is carried out. To the previous filtrate, 27 kg of zinc sulfate is added, stirring constantly, and 15 kg of EDTA, 9 kg of boric acid, 21 kg of urea and 39 L of the silicate base prepared in Example 1 to 6 are added, and the mixture is stirred for 30 minutes. Add 1.2 kg xanthan gum (previously hydrated with 0.15 kg potassium sorbate) and stir the mixture for 30 minutes.

| Preparation of liquid fertilizer composition on the basis of silicate and phosphite | | | | |
|---|---|---|---|---|
| | Example 11 | Example 12 | Example 13 | Example 14 |
| Silicate base | 12.98% w/w | 24.58% w/w | 32.46% w/w | 14.09% w/w |
| Additional Ingredients | 87.02% w/w | 75.42% w/w | 67.54% w/w | 85.91% w/w |
| water | 43.27% w/w | 39.33% w/w | 23.80% w/w | 43.75% w/w |

-continued

Preparation of liquid fertilizer composition on the basis of silicate and phosphite

|  | Example 11 | Example 12 | Example 13 | Example 14 |
|---|---|---|---|---|
| Hydrated lime | 6.49% w/w | 3.69% w/w | 6.49% w/w | 5.93% w/w |
| phosphorous acid | 17.45% w/w | 9.91% w/w | 17.45% w/w | 15.87% w/w |
| Potassium carbonate | 2.16% w/w | 2.46% w/w | 2.16% w/w | 2.22% w/w |
| Zinc sulphate | 6.49% w/w | 7.37% w/w | 6.49% w/w | 6.67% w/w |
| EDTA | 3.61% w/w | 4.10% w/w | 3.61% w/w | 3.71% w/w |
| Boric acid | 2.16% w/w | 2.46% w/w | 2.16% w/w | 2.22% w/w |
| Urea | 5.05% w/w | 5.74% ww | 5.05% w/w | 5.19% w/w |
| Xanthan gum | 0.29% w/w | 0.33% w/w | 0.29% w/w | 0.30% w/w |
| Potassium sorbate | 0.04% w/w | 0.04% w/w | 0.04% w/w | 0.04% w/w |

Example 15

Preparation of the Liquid Fertilizer Composition Based on Silicate and Fulvic Acids (MISILK 360®):

For the preparation of a liquid fertilizer composition based on silicate and fulvic acids, 5.39 L of water is added to the mixing tank with constant stirring. 257.74 L of silicate base previously prepared in Example 1 to 6 and 21.67 kg of fulvic acid are added.

Subsequently, 0.35 kg of xanthan gum (previously hydrated with 0.56 kg of potassium sorbate) is added to the solution. Finally, the final volume of the suspension is checked and adjusted, if necessary, with water.

Preparation of liquid fertilizer composition on the basis of silicate and fulvic acids

|  | Example 15 | Example 16 | Example 17 | Example 18 |
|---|---|---|---|---|
| Silicate base | 90.58% w/w | 67.91% w/w | 61.83% w/w | 75.50% w/w |
| Additional Ingredients | 9.42% w/w | 32.09% w/w | 38.17% w/w | 24.50% w/w |
| water | 1.83% w/w | 23.39% w/w | 19.43% w/w | 16.99% w/w |
| Fulvic acid | 7.38% w/w | 8.49% w/w | 18.55% w/w | 7.31% w/w |
| Xanthan gum | 0.02% w/w | 0.02% w/w | 0.02% w/w | 0.02% w/w |
| Potassium sorbate | 0.19% w/w | 0.19% w/w | 0.18% w/w | 0.19% w/w |

Example 19

Preparation of Liquid Fertilizer Composition Based on Silicate and Amino Acid (NITROSIL K®):

For the preparation of a liquid fertilizer composition based on silicate and amino acid, 5.44 L of water is added to the mixing tank and the stirring process is started. Then, 267.37 L of silicate base prepared previously in Example 1 to 6 and 16.69 kg of 80% free amino acids are added. Subsequently, 0.3 kg of xanthan gum (previously hydrated with 0.6 kg of potassium sorbate) is added to the solution and the mixture is stirred for 1 hour.

Preparation of liquid fertilizer composition based on silicate and amino acids

|  | Example 19 | Example 20 | Example 21 | Example 22 |
|---|---|---|---|---|
| Silicate base | 87.82% w/w | 75.97% w/w | 73.95% w/w | 66.48% w/w |
| Additional Ingredients | 12.18% w/w | 24.03% w/w | 26.05% w/w | 33.52% w/w |
| water | 1.67% w/w | 4.75% w/w | 14.79% w/w | 28.49% w/w |
| amino acids | 10.24% w/w | 18.99% w/w | 10.97% w/w | 4.75% w/w |
| Xanthan gum | 0.09% w/w | 0.09% w/w | 0.10% w/w | 0.09% w/w |
| Potassium sorbate | 0.18% w/w | 0.19% w/w | 0.20% w/w | 0.19% w/w |

Example 23

Effect of the Use of Liquid Fertilizer Composition Based on Silicate for the Control of Codling Moth *Spodoptera frugiperda* in Maize.

The evaluation was carried out in the municipality of Puerto Gaitan, Meta, at a latitude of 300 meters above sea level, 200 hectares in the maize variety BM709. A complete randomized design was used with two treatments for silicon F 1.0 L/Ha and a CONTROL without application, where 5 replicates were performed. The evaluation was carried out on 10 plants, where 4 applications were made per treatment with a frequency of 15 days each, the volume of water used was 175 L/Ha per application. A random sampling was carried out on 50 plants per treatment making 2 evaluations. In the first one, the percentage of incidence of *Spodoptera frugiperda* on the 3 thirds of the plant was evaluated as shown in FIG. 1, where 1) is the lower third, 2) is the middle third and 3) is the upper third.

Figure 2:
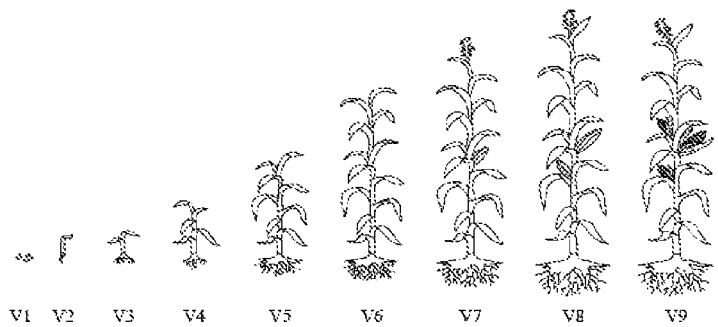
FIG. 2 Application periods according to phenological stages.

Later, a second evaluation was carried out where the % of incidence and damage of the pest on the complete plant was evaluated and finally the final value of the yield per hectare (kg/Ha) was obtained. The applications were made on phenological stages (v2-v3), (v4-v5), (v6-v7) and (v8-v9). As shown in FIG. 2.

TABLE 1

Phenological stages of Maize.

| PHENOLOGICAL STATE | | |
|---|---|---|
| V2-V3 | 1 application | Seedling growth |
| V4-V5 | 2 application | Vegetative growth |
| V6-V7 | 3 application | Vegetative growth |
| V8-V9 | 4 application | Vegetative growth |

To the number of larvae and the % of damage by *Spodoptera frugiperda* analysis of variance and Tukey's mean comparison tests were carried out with the statistical program Infostat. Version 2017 to establish differences between treatments.

TABLE 2

Percentage incidence of damage by pest (*Spodoptera frugiperda*).

| | INCIDENCE OF MECHANICAL DAMAGE DUE TO SPOTERA % | | | |
|---|---|---|---|---|
| TREATMENTS | LOWER THIRD | MIDDLE THIRD | UPPER THIRD | TOTAL AVERAGE |
| SILICON F | 3.3 | 3.0 | 7.1 | 4.5% |
| CONTROL | 16.4 | 18.6 | 28.5 | 21.2% |

As may be seen in Table 2, the percentage of damage by *Spodoptera frugiperda* on the thirds of the plant are much more marked on the CONTROL treatment with 21.2% compared to 4.5% of plants treated with the product SILICON F being the lower and middle third the least affected by the pest, which shows that the product SILICON F has a preventive effect on the attack of *Spodoptera frugiperda*.

Additionally, Graph 1 shows the significant differences between the treatments applied on maize crop, being the SILICON F treatment the one that presents lower percentage of damage on the thirds of the plant, in comparison with the COMMERCIAL PATTERN CONTROL treatment. Additionally, in Table 3 it is observed the comparison of means of Tukey with a significance level of 95%, there are significant differences between treatments and between thirds of the plant for the damage caused by *Spodoptera frugiperda*.

TABLE 3

Tukey's comparison of means (means with a common letter are not significantly different (p > 0.05)).

| SILICON F | % *Spodoptera* Damage | CONTROL | % *Spodoptera* Damage |
|---|---|---|---|
| MIDDLE | 2.96 a | LOWER | 16.42 a |
| LOWER | 3.34 a | MIDDLE | 18.58 a |
| UPPER | 7.10 b | UPPER | 28.50 b |

Figure 3:
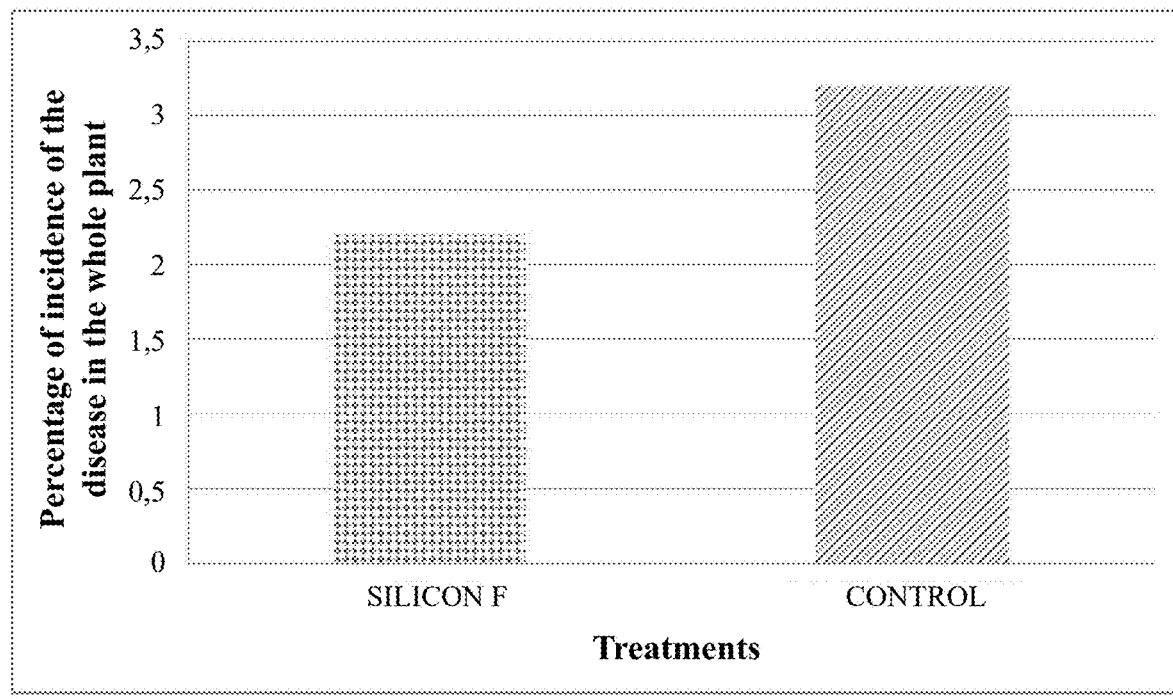
FIG. 3 Percentage incidence of fungal disease (leaf spot) on whole plant.
Figure 4:
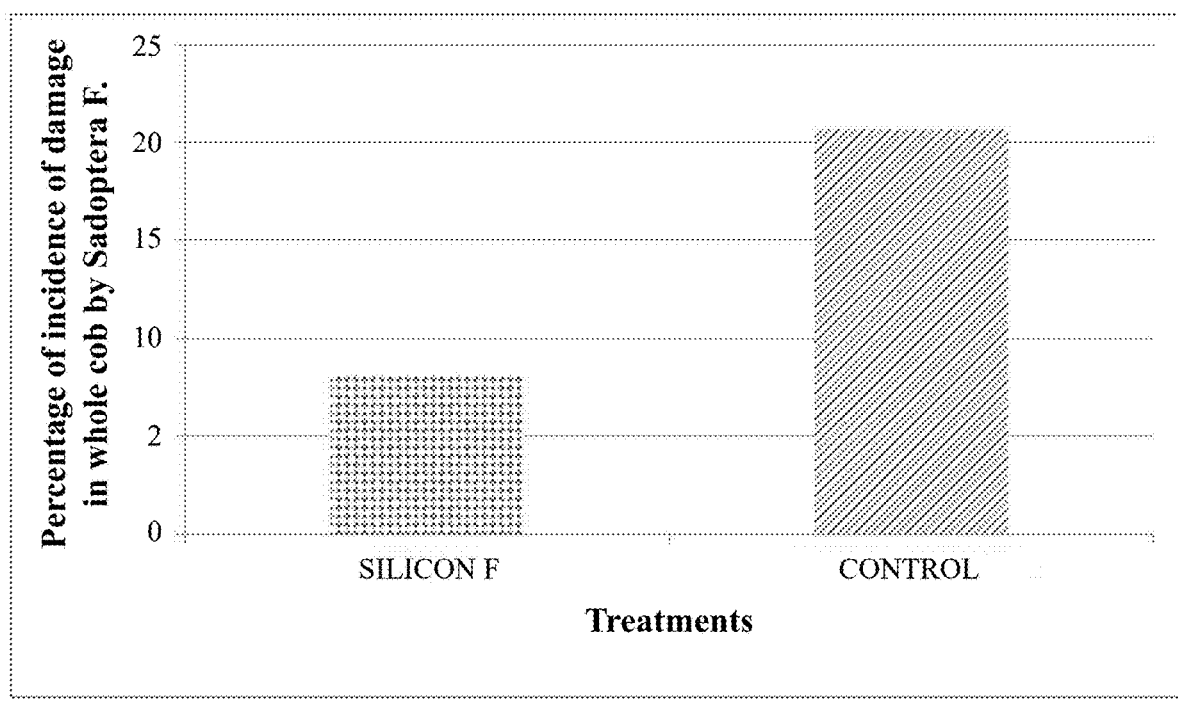
FIG. 4 Percentage incidence of damage to whole cob by *Spodoptera F*.

Now, the second evaluation was carried out in order to evaluate the % of incidence of the disease in the whole plant, according to the scale where 1 is completely healthy and 9 is completely affected. As shown in FIG. 3, the incidence of the fungal complex had a lower impact on maize plants treated with SILICON F, compared with the treatment of CONTROL with a difference of 30%. Statistically, it also showed significant differences in the Tukey's comparison of means.

Additionally, with regard to the yield evaluation, once the weight value in kilograms of the plots is obtained, a greater gain of kilograms per hectare was obtained on the treatment in which the product SILICON F was used with an advantage of 889 kg over the CONTROL treatment. As shown in Table 4, there are significant differences on the yield variables.

Additionally, with regard to the yield evaluation, once the weight value in kilograms of the plots is obtained, a greater gain of kilograms per hectare was obtained on the treatment in which the product SILICON F was used with an advantage of 889 kg over the CONTROL treatment. As shown in Table 4, there are significant differences on the yield variables.

TABLE 4

Yield variables for each of the treatments.

| TTO | GROSS WEIGHT | TARE | NET WEIGHT | FINAL WEIGHT | HARVESTED AREA. Ha | MEAN/Ha |
|---|---|---|---|---|---|---|
| CONTROL | 58280 | 18360 | 39920 | 38330 | 18.3 | 4074 |
| SILICON F | 50840 | 17970 | 32870 | 31261 | 12.2 | 4889 |

In this regard, Tukey's comparison of means with a significance degree of 95% for yield variables, shows significant differences between treatments.

TABLE 5

Comparison of Tukey measures (means with a common letter are not significantly different (p > 0.05)).

| TTO | GROSS WEIGHT | NET WEIGHT | FINAL WEIGHT | MEAN/Ha |
|---|---|---|---|---|
| CONTROL a | 56650 a | 38775 a | 37274.5 a | 4074 a |
| SILICON F b | 49505 a | 31280 a | 29823.5 a | 4889 b |

Finally, a foliar analysis was carried out, as shown in Table 6 to 9 below:

TABLE 6

Foliar analysis for the determination of the percentage of N, P, K, Ca, Mg, S and $SiO_2$ absorbed by the plant.

| Lab. No. | Identification Batch | Variety | N | P | K | Ca | Mg | S | $SiO_2$ |
|---|---|---|---|---|---|---|---|---|---|
| | | | | | % | | | | |
| 108376 (107693) | Tecnosil ® (oil + silicon) + sikonfert ® sulfur (silicon + sulfur) | Not specified | 2.68 | 0.27 | 1.97 | 0.39 | 0.66 | 0.14 | 1.8 |
| 108377 (107694) | Silicon F | Not specified | 2.3 | 0.2 | 1.68 | 0.41 | 0.09 | 0.1 | 2.7 |
| 108378 (107695) | CONTROL | Not specified | 2.35 | 0.24 | 1.9 | 0.39 | 0.05 | 0.18 | 2.3 |
| | Medium level | | 3.00-3.50 | 0.25-0.45 | 2.00-2.50 | 0.25-0.50 | 0.13-0.30 | 0.15-0.50 | — |
| | Theoretical Std. Range 154 | | 3.08-3.56 | 0.46-0.55 | 3.56-4.16 | 0.44-0.50 | 0.16-0.20 | 0.28-0.36 | — |
| | Experimental Std. 154 | | 3.22 | 0.49 | 3.95 | 0.46 | 0.19 | 0.32 | — |

Note:
Pattern 154 is a sample from the Analytical Exchange program with Wageningen University in the Netherlands and is used to evaluate the accuracy of chemical analyses

TABLE 7

Foliar analysis for the determination of the concentration (ppm) Fe, Mn, Cu, Zn and Na absorbed by the plant.

| No. Lab. | Identification Batch | Variety | Fe | Mn | Cu | Zn | B | Na |
|---|---|---|---|---|---|---|---|---|
| | | | | | ppm | | | |
| 108376 (107693) | Tecnosil ® + sikonfert ® sulfur | Not specified | 82 | 83 | 10 | 29 | 10 | 155 |
| 108377 (107694) | Silicon F | Not specified | 71 | 91 | 5.3 | 24 | 9.1 | 110 |
| 108378 (107695) | CONTROL | Not specified | 81 | 141 | 9.4 | 36 | 9.2 | 140 |
| | Medium level | | 30.0-200 | 20.0-300 | 3.00-15.0 | 15.0-60.0 | 4.00-25.0 | 100-200 |
| | Theoretical Pat. Range 154 | | 307-343 | 76-84 | 6.5-7.5 | 37-41 | 2.86-3.38 | 2568-3012 |
| | Experimental Pat. 154 | | 335 | 79 | 6.8 | 38 | 2.96 | 2854 |

Note:
Pattern 154 is a sample from the Analytical Exchange program with Wageningen University in the Netherlands and is used to evaluate the accuracy of chemical analyses

TABLE 8

Foliar analysis for the determination of the percentage of saturated K, Ca and Mg absorbed by the plant.

| Lab. No. | Identification Batch | Variety | Sat. K | Sat. Ca | Sat. Mg |
|---|---|---|---|---|---|
| | | | % | | |
| 108376 (107693) | Tecnosil ® + sikonfert ® sulfur | Not specified | 67.4 | 26 | 6.59 |
| 108377 (107694) | Silicon F | Not specified | 60.7 | 28.9 | 10.4 |
| 108378 (107695) | CONTROL | Not specified | 67.4 | 27.00 | 5.69 |
| | Medium level | | 56.3-68.9 | 16.8-22 | 14.4-21.7 |

TABLE 9

Foliar analysis for the determination of Ca/Mg, Ca/K, Mg/K, (Ca + Mg)/K, N/S, N/P, Ca/B and Fe/Mn absorbed by the plant.

| Lab. No. | Identification Batch | Variety | Ca/Mg | Ca/K | Mg/K | (Ca + Mg)/K | N/S | N/P | Ca/B | Fe/Mn |
|---|---|---|---|---|---|---|---|---|---|---|
| 108376 (107693) | Tecnosil ® + sikonfert ® sulfur | Not specified | 3.95 | 0.39 | 0.1 | 0.48 | 19.1 | 9.93 | 390 | 0.99 |
| 108377 (107694) | Silicon F | Not specified | 2.77 | 0.48 | 0.17 | 0.65 | 23 | 11.5 | 451 | 0.78 |
| 108378 (107695) | CONTROL | Not specified | 4.74 | 0.4 | 0.08 | 0.48 | 13.1 | 9.79 | 424 | 0.57 |
| | Medium level | | 1.01-1.17 | 0.24-0.39 | 0.21-0.39 | 0.45-0.78 | 7-20 | 7.78-12 | 200-625 | 0.67-1.5 | wherein it is evident that increases the concentration of silicon in the leaves with a value of 2.71% for the treatment of SILICON F, while the treatment of CONTROL obtained 2.25%.

Figure 5:
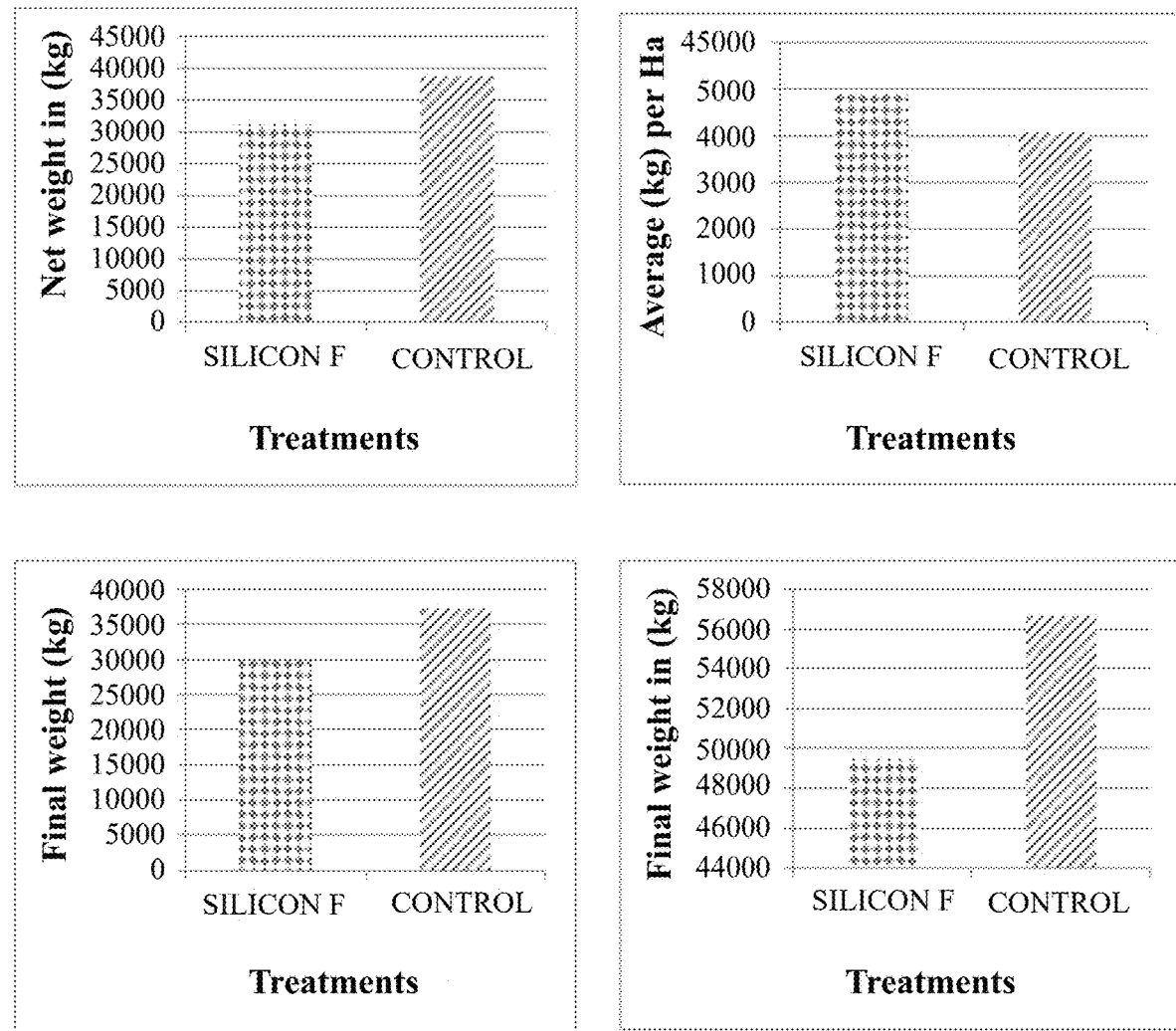
FIG. 5 Variable summaries of maize harvest, showing net weight in kg.

In conclusion, the product SILICON F obtained a favorable effect on maize plants (FIG. 5), which again confirms the advantages of silicon regarding the physical-mechanical resistance against the attack of *Spodoptera frugiperda* larvae on stalks, leaves and cob, since SILICON F had a better response to the attack of pests and diseases decreasing between 30% for such damage. Additionally, SILICON F helps to reduce the damage by 29% in the middle third of the plant where the cob is formed. Finally, it was observed that with the SILICON F treatment there is less light entry in the planting furrow and that the leaves have more turgidity and greater thickness.

Example 24

Effect of SIKONFERT® Cu/Zn Applications on Growth and Development in the Rice Crop Oriza *Sativa* L.

The test was carried out in two phases, in the first one the phytotoxicity of the product is evaluated and in the second one the yield variables are evaluated from different doses:

Phytotoxicity Test

Phytotoxicity tests were conducted to evaluate the effect of the product SIKONFERT® Cu/Zn on rice plants. The tests were conducted in the city of Ibague, Tolima (Colombia) on rice, in traditional broadcast planting, on an area of 400 m². For the phytotoxicity test was used the scale of the NTC 736 "tests to determine the phytotoxicity simulating conventional applications".

TABLE 10

Phytotoxicity scale according to INCONTEC NTC 736.

| Degree | Description |
|---|---|
| 0 | Plants like the pattern |
| 1 | Mild chlorosis and presence of freckles (small dots) |
| 2 | Accentuated chlorosis and slight distinguishable reduction in growth; presence of few spots |
| 3 | Growth inhibition, marked chlorosis and morphological abnormalities |

TABLE 10-continued

Phytotoxicity scale according to INCONTEC NTC 736.

| Degree | Description |
|---|---|
| 4 | Plant badly affected, with no chance of recovery. Some parts of green tissue are present. |
| 5 | Necrosis and death of the plant |

Three applications were carried out with a dose of 2.5 L/Ha, which corresponds to double the maximum doses to be evaluated, where applications were carried out every 15 days on strips of 20 meters.

TABLE 11

| Treatments | |
|---|---|
| ITEM Pattern | No application |
| Sikonfert ® Cu/Zn (T-1) | Dosage 0.5 L/Ha |
| Sikonfert ® Cu/Zn (T-2) | Dosage 0.75 L/Ha |
| Sikonfert ® Cu/Zn (T-3) | Dosage 1.0 L/Ha |
| Sikonfert ® Cu/Zn (T-4) | Dosage 1.25 L/Ha |
| Volume of H$_2$O/Ha | 400 L H$_2$O/Ha |

The field design is shown below in Table 12.

TABLE 12

Statistical design.
STATISTICAL DESIGN INFORMATION
TITLE: EVALUATION OF THE EFFECTIVENESS OF THE
FOLIAR FERTILIZER SIKONFERT ® COPPER ZINC IN THE
CROP OF RICE (*Oryza Sativa* l.)

| Test feature | Type: completely randomized blocks (CRB) | Total area of the experiment: 400 m$^2$ |
|---|---|---|
| | Plot dimension Experimental unit area | 5 m × 4 m = 20 m$^2$ |
| | Area per repetition | 5 m × 4 m × 5 Trat = 60 m$^2$ |
| | Total test area | 5 m × 4 m × 5 Trat × 4 rept. = 180 m$^2$ |
| | Area to be harvested | 400 m$^2$ |
| | Treatment | 5 |
| | Repetitions | 4 |

Three applications were made at 30 DDS (maximum tillering), 50 DDS (primordium formation) and 65 DDS (maximum lodging).

Figure 6:
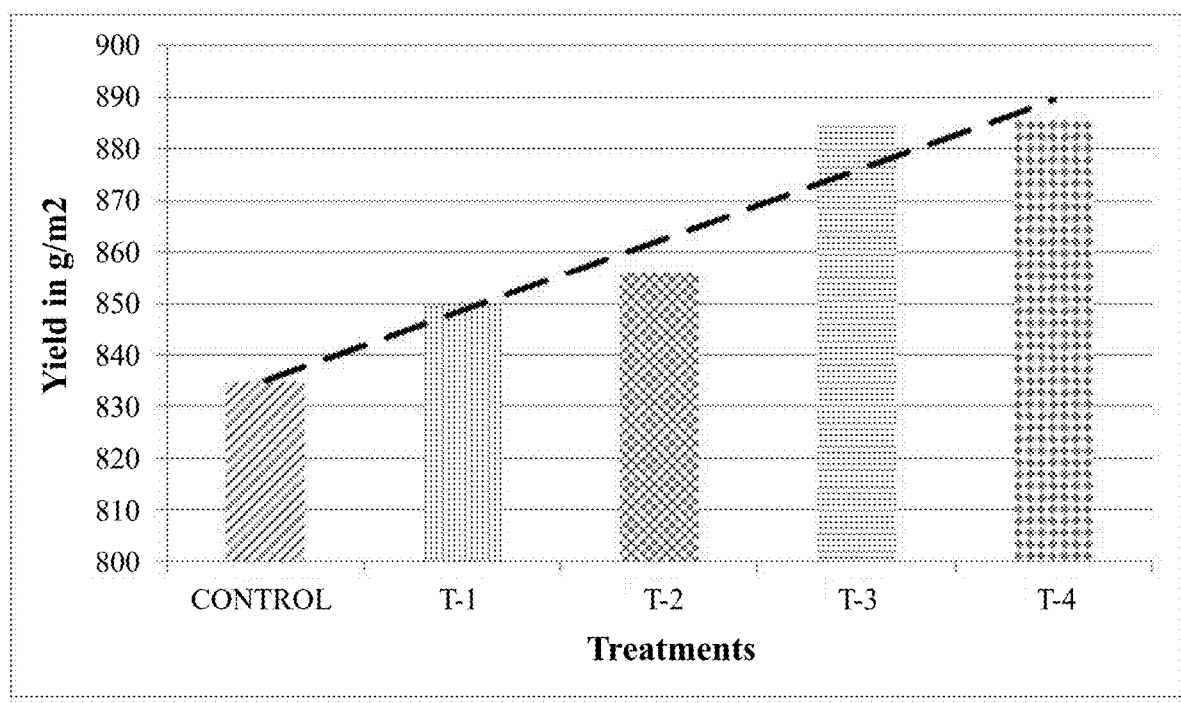
FIG. 6 Yield $m^2$ for each of the treatments.

Now, regarding the yield, the best response was presented by applying the dose of 1.25 L/Ha of Paddy rice (8855 kg/Ha), 506 kg/Ha more in comparison with the pattern treatment that obtained 8349 kg/Ha, this increase corresponds to 6.0% with the application of the product on the dates established, helping totally to improve the number of panicles per m$^2$, greater number of full grains, better weight of thousand grains and decreasing the percentage of empty grains, as shown in FIG. 6.

The number of panicles per m$^2$ was affected and varied a little by the traditional sowing system (aerial) used by the farmer. On average we found between 300 to 350 panicles per m$^2$, it is noteworthy that plants with greater application of the product SIKONFERT® Cu/ZN had more erect panicles and more consistency in its structure.

The weight in grains was affected by the applications of the product SIKONFERT® Cu/Zn, especially in the highest doses of 1 and 1.25 L/Ha increased between 7.0 and 10% weight in grams of grain.

The piling index (PI), is the multiplication between the evaluator, which is the integer, by the blank (rp) which is the result of threshing when the rice is polished.

When talking about milling analysis, the most important term is the PI, which, as stated in NTC 519, corresponds to the percentage of whole milled grains resulting from the husking and polishing of dry paddy rice, free of impurities.

Table 13

Yield components rice seed variety (Fedearroz 67), (means with a common letter are not significantly different (p > 0.05)).

| TTo | Yield g/m$^2$ | No. of grains per panicle | No. of panicles/ m$^2$ | Weight of 1000 grains | % hollowing | PI |
|---|---|---|---|---|---|---|
| Control | 834.9 a | 97.0 a | 313.7 a | 24.7 a | 3.1% | 53.41 |
| 0.5 L/Ha | 849.8 a | 97.3 ab | 318.2 a | 25.0 a | 3.4% | 59.65 |
| 0.75 L/Ha | 855.9 b | 100.3 b | 320.1 a | 25.0 a | 2.6% | 59.74 |
| 1.0 L/Ha | 885.0 b | 98.9 b | 346.0 b | 27.5 b | 2.0% | 63.83 |
| 1.25 L/Ha | 885.5 b | 108.5 c | 343.2 b | 26.5 b | 2.0% | 68.26 |

TABLE 14

Percentage of hollowing by treatment.

| TTO | WEIGHT OF 1000 GRAINS | WEIGHT OF EMPTY GRAINS | WEIGHT OF FULL GRAINS | % HOLLOWING |
|---|---|---|---|---|
| CONTROL | 24.7 | 0.74 | 24.0 | 3.1% |
| T-1 | 25.0 | 0.82 | 24.1 | 3.4% |
| T-2 | 25.0 | 0.62 | 24.4 | 2.6% |
| T-4 | 26.5 | 0.53 | 26.0 | 2.% |
| T-3 | 27.5 | 0.55 | 27.0 | 2.0% |

Figure 7:
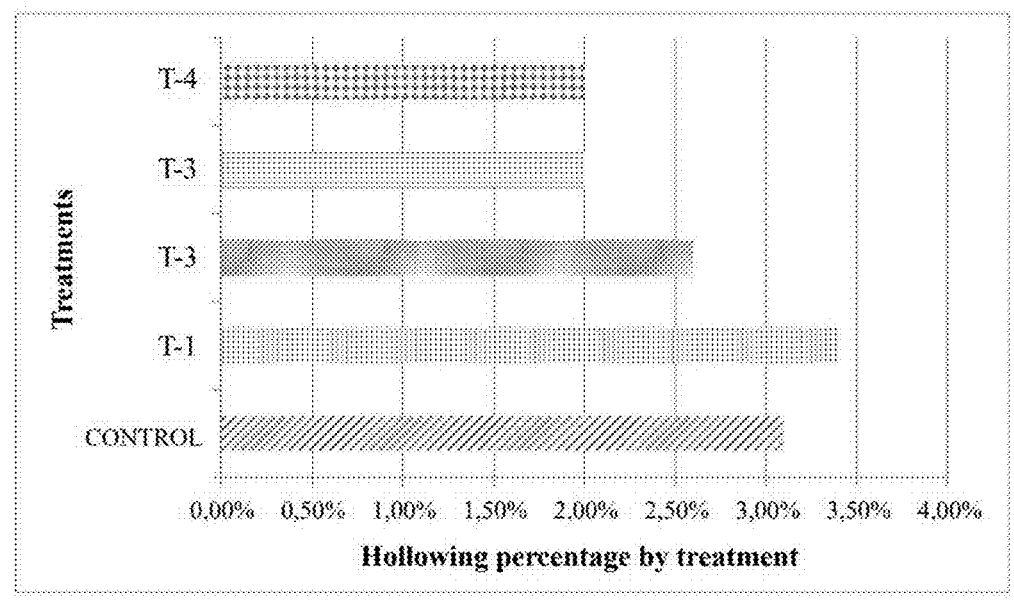
FIG. 7 Percentage of hollow plants by treatment.

In the milling analysis for the three treatments, Table 14 and FIG. 7 show differences in the shelling index, white grain, white broken and whole and broken grains. This benefit is attributed to the product SKINOFERT® Cu/Zn that due to its composition with elements such as silicon, copper and zinc, helps the mobilization of nutrients improving the filling and quality of the grains.

TABLE 15

Milling analysis.

| SAMPLE | WHOLE | BROKEN WHOLE | WHITE PR | BROKEN | PI | EVAL-UATOR |
|---|---|---|---|---|---|---|
| Control | 79.89 | 14.3 | 68.56 | 15.16 | 53.41 | 77.9 |
| T-2 | 71.47 | 10.9 | 74.28 | 12.67 | 59.65 | 80.3 |
| T-1 | 78.17 | 19.7 | 74.53 | 21.2 | 59.74 | 84.7 |
| T-3 | 84.82 | 15.5 | 78.49 | 18.77 | 64.83 | 82.6 |
| T-4 | 83.41 | 9.3 | 80.69 | 11.72 | 68.26 | 84.6 |

As for the estimated cost-benefit projection, the cost was determined according to the yield per m$^2$ obtained at the time of trial evaluation, the value of a liter of SKINOFERT® Cu/Zn fertilizer of $25,000 pesos (hypothetical) was considered.

The net profit was determined for each of the treatments by obtaining the difference of the gross profit minus the total cost of the application. Sales prices were taken from the mill report for the date of harvest. The profit is the percentage obtained from the difference of the net profit of the treatments treated with the product SIKONFERT® Cu/Zn against the pattern.

TABLE 16

Estimated cost-benefit projection (*Source, Fedearroz: $ 1,000,000 ton).

| Treatment | Production per g/m$^2$ | Yield kg/Ha | No. sacks (62.5)/Ha | *Selling price (Tn) | Cost of the application/Ha | Net profit | % profit |
|---|---|---|---|---|---|---|---|
| Control | 834.9 | 8348.7 | 133.6 | $8,348,712 | | $8,348,712 | |
| T-1 | 849.8 | 8498.5 | 136.0 | $8,498,485 | $37,500 | $8,460,985 | 1.3 |
| T-2 | 855.9 | 8559.5 | 137.0 | $8,559,470 | $56,250 | $8,503,220 | 1.9 |
| T-3 | 885.0 | 8850.0 | 141.6 | $8,850,000 | $75,000 | $8,775,000 | 5.1 |
| T-4 | 885.5 | 8855.2 | 141.7 | $8,855,227 | $93,750 | $8,761,477 | 4.9 |

In conclusion, the applied doses of the product SKINOFERT® Cu/Zn, on the rice crop had a positive effect on the yield compared to the pattern treatment. Also, the product SIKONFERT® Cu/Zn stimulates the growth and development of the plants giving a more erect structure to the leaves and more coloration to the leaves, more resistant stems and a greater number of tillers, less spotted and empty grains. Finally, the application of SIKONFERT® Cu/Zn increased the weight of grains and the number of panicles per m$^2$.

Example 25

Evaluation of the Effect of MISILK 360® on the Contribution of Physical-Mechanical Resistance to Downy Mildew Attack in Rose Var Orange Crush.

A liquid solution of Misilk 360® was applied to 40 beds of roses, Orange Crush variety, in full production, at a dose of 15 cc/bed, with a biweekly frequency and for 16 weeks.

The application was carried out in a module of 40 beds. The discharge of the sprayer was connected to the air relief valve of the module, injecting the mixture of Misilk 360® at a rate of 30 liters plus the volume of fertilized irrigation program equivalent to 130 liters. In order to know the accumulation of silicon in the plant, a foliage sample was taken at the beginning of the trial and one at the end of the 16 weeks of trial.

The product Misilk 360® may be applied alone or in mixture with the other products that are programmed for the general treatment of the crop in the aspect of fertilization and/or sanitation. The measurement of incidence of the pathogen downy mildew (*Peronospora sparsa*, Berkeley) was done in the field comparing the incidence levels of the bed of varieties treated with silicon and the adjacent varieties that were not treated with silicon and of the same variety.

The data obtained from the percentage of the incidence of downy mildew on rose plants, showed significant differences between treatments, where you may see the application effectiveness of the product mil Misilk 360®, reduced by 96% the incidence of the disease showing healthier plants and with enhanced toughness.

(*applications were started in week 37. The level of downy mildew is at 10% between the 1st and 2nd weeks, it goes down to 2.5 and drops to 0 and stays that way until week 2 of year 18 when it is suspended and goes up again. The pattern (without application of Misilk 360®) remains at high levels, although in both areas fungicides were applied to control downy mildew.)

Table 17. Data collection template for each of the rose cultivation treatments, Orange Crush variety, block 13.

Figure 8:
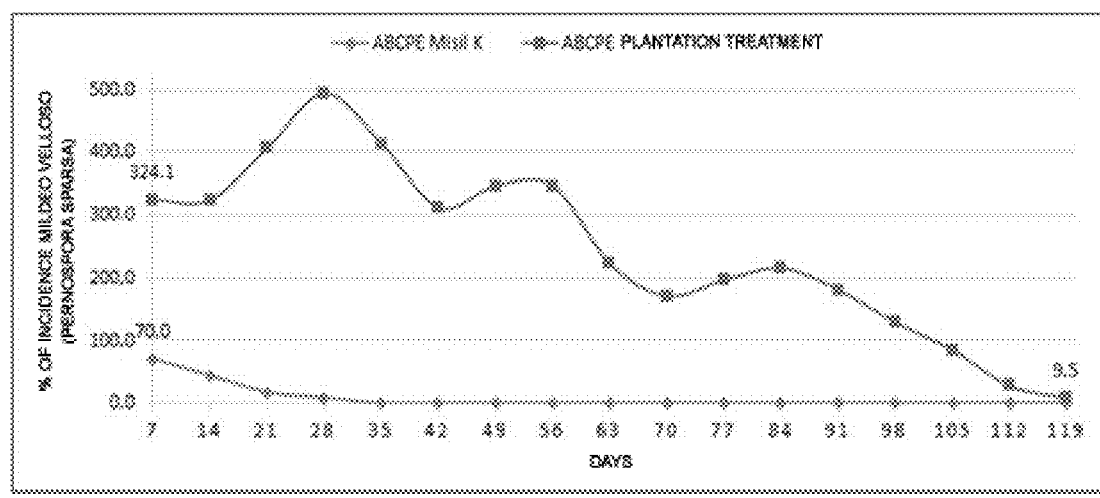
FIG. 8 Area of hairy mildew disease progress (*Peronospora sparsa*) progress by treatment, wherein the yellow dots are the days of MISILK 360& application.

As shown in FIG. 8, the behavior of the progress of the disease in the course of the days for each one of the treatments, being the Misilk 360® treatment the one that presents lower percentages of incidence of hairy mildew in comparison with the plantation treatment. According to Table 17 of comparison of means of LDS FISHER with a significance level of 95% there are significant differences.

TABLE 18

Comparison of LDS FISHER means (means with a common letter are not significantly different ($p > 0.05$)).

| Treatments | % incidence Mildeo Velloso |
|---|---|
| Misilk 360 ® | 1.25 a |
| CONTROL | 37.5 b |

Now: Table 19 shows the progress of the disease for each of the treatments, the calculations obtained show an approximate daily growth rate of 1.25% for the Misilk 360® treatment and 37.6% for the plantation treatment: again, the efficacy of the product Misilk 360® in providing mechanical resistance to the plants is verified.

TABLE 19

Area of the disease Downy mildew progress (*Pernospora sparsa*)

| week/year | DDA* | MISILK 360 ® | ABCPE MISILK 360 ® | CONTROL | ABCPE CONTROL |
|---|---|---|---|---|---|
| 37 | 7 | 10 | 70 | 46.3 | 324.1 |
| 38 | 14 | 2.5 | 43.8 | 46.3 | 324.1 |
| 39 | 21 | 2.5 | 17.5 | 70 | 407.1 |
| 40 | 28 | 0 | 8.8 | 71 | 493.5 |
| 41 | 35 | 0 | 0 | 47.2 | 413.7 |
| 42 | 42 | 0 | 0 | 41.8 | 311.5 |
| 43 | 49 | 0 | 0 | 57.2 | 346.5 |
| 44 | 56 | 0 | 0 | 41.8 | 346.5 |
| 45 | 63 | 0 | 0 | 21.8 | 222.6 |
| 46 | 70 | 0 | 0 | 27.2 | 171.5 |
| 47 | 77 | 0 | 0 | 29 | 196.7 |
| 48 | 84 | 0 | 0 | 332.7 | 216 |
| 49 | 91 | 0 | 0 | 19 | 181 |
| 50 | 98 | 0 | 0 | 18 | 129.5 |
| 51 | 105 | 0 | 0 | 6.3 | 85.1 |
| 52 | 112 | 0 | 0 | 1.8 | 28.4 |
| 1 | 119 | 0 | 0 | 0.9 | 9.5 |
| TOTAL | | 140 | | 4207 | |
| STANDARDIZED | | 1.25 | | 37.6 | |

(*DDA: days after application, *45: for this week it was not possible to make the application of Misilk 360 ®).

| LABORATORY NO. | IDENTIFICATION BATCH/VARIETY | READ DATE | N | P | K | Ca | Mg | S | SiO2 | Fe | Mn | Cu | Zn | B | Na | Mo | Cl |
|---|---|---|---|---|---|---|---|---|---|---|---|---|---|---|---|---|---|
| | | | %PERCENTAGE | | | | | | | p.p.m. | | | | | | | (Chlorides) |
| V-07X000X | Orange Crush | INITIAL OCT. 25-2017 | 4.68 | 0.67 | 2.69 | 3.36 | 0.4 | 0.54 | 0.1903 | 162 | 189 | 45 | 79.9 | 77.3 | 4289 | <1 | 533 |
| V-35X003X00 | Orange Crush | FINAL JAN. 25-18 | 3.99 | 0.46 | 1.89 | 3.16 | 0.32 | 0.35 | 0.299 | 171 | 184 | 49 | 137 | 34.5 | <289 | <1 | 368 |
| NIVEL MEDIO | | | 3.20-5.00 | 0.10-0.35 | 1.40-2.35 | 3.00-3.40 | 0.30-0.40 | 0.30-0.40 | | 60-150 | 300-800 | 7.00-17 | 15.0-90 | 55.0-75 | 1000-2500 | | |

Table 20. Laboratory foliar analysis, evaluation of the product Misilk 360® 15 cc/bed (of 32 m$^2$). Biweekly application No. of applications: 8.

In conclusion, during the 16 weeks of the applications with Misilk 360® product, it was possible to maintain the percentage of incidence of the constant disease during the biweekly frequencies of application in rose plants, compared to the control treatment with a difference of 96% (considering that this was in a different block in slightly different environmental conditions and with a much higher disease pressure, but retaining the principle of being the same variety and the same substrate). The control period has an approximate effect of 15 days, because as shown in Table 18 in week No. 3 of 2018 when the silicon applications are finalized, the disease incidence will be revived.

Finally, the foliar analysis shows the accumulated effect of silicon in the leaf, in the second intake it had an increase of 1043 ppm compared to the initial intake. Considering the foregoing, it is concluded that the formulation is mobile in the plant.

The invention claimed is:

1. A liquid fertilizer composition, comprising a silicate base composition between 10% to 98% (w/w) and additional ingredients, wherein the silicate base composition comprises:
  potassium silicate, at a concentration between 50% to 90% (w/w);
  a pH regulator, at a concentration between 5% to 17% (w/w);
  an emulsifier, at a concentration between 1% to 20% (w/w);
  water between 1 to 42.95% (w/w);
  a dispersant, at a concentration between 0.05% to 25% (w/w);
  an antifreeze, in a concentration between 1% to 15% (w/w);

wherein the additional ingredients comprise copper sulfate, zinc sulfate, calcium hydroxide, phosphorous acid, potassium carbonate, boric acid, urea, fulvic acid, amino acids, EDTA, xanthan gum, potassium sorbate and water; and wherein the silicate base composition is a suspension characterized by a pH between 4.5 to 6 and a potassium silicate particle size between 5 to 40 µm.

2. The liquid fertilizer composition according to claim 1, wherein the pH regulator in the silicate base composition is selected from the group comprising lactic acid, citric acid, humic acids, fulvic acids, or a mixture thereof.

3. The liquid fertilizer composition according to claim 1, wherein the emulsifier in the silicate base composition is selected from the group comprising a mixture of surfactants derived from vegetable oils, anionic and nonionic surfactants and soybean oil, or a mixture thereof.

4. The liquid fertilizer composition according to claim 1, wherein the dispersant in the silicate base composition is selected from the group comprising polymethylmethacrylate-polyethylene glycol graft copolymer in copolymeric acrylic solution and xanthan gum or a mixture thereof.

5. The liquid fertilizer composition according to claim 1, wherein the antifreeze agent in the silicate base composition is selected from the group comprising propylene glycol, butylene glycol, dipropylene glycol, triethylene glycol, methanol, ethylene glycol or a mixture thereof.

6. The liquid fertilizer composition according to claim 1, wherein the silicate base composition comprises potassium silicate, citric acid, lactic acid, a mixture of surfactants derived from vegetable oils, anionic and nonionic surfactants, soybean oil, polymethylmethacrylate-polyethylene glycol graft copolymer in copolymeric acrylic solution, propylene glycol, xanthan gum and water.

7. The liquid fertilizer composition according to claim 1, wherein the additional ingredients are selected from potassium phosphite, copper sulfate, zinc sulfate, EDTA, xanthan gum, potassium sorbate.

8. The liquid fertilizer composition according to claim 1, wherein the additional ingredients are selected from calcium hydroxide, phosphorous acid, potassium carbonate, zinc sulfate, EDTA, boric acid, urea, xanthan gum, potassium sorbate and water.

9. The liquid fertilizer composition according to claim 1, wherein the additional ingredients are selected from fulvic acid, xanthan gum, potassium sorbate and water.

10. The liquid fertilizer composition according to claim 1, wherein the additional ingredients are selected from amino acids, xanthan gum, potassium sorbate and water and wherein the amino acids are selected from alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine or mixtures thereof.

* * * * *